United States Patent
Kaner et al.

(10) Patent No.: US 8,808,658 B2
(45) Date of Patent: Aug. 19, 2014

(54) RAPID SOLID-STATE METATHESIS ROUTES TO NANOSTRUCTURED SILICON-GERMAINUM

(75) Inventors: Richard B. Kaner, Pacific Palisades, CA (US); Sabah K. Bux, Chino Hills, CA (US); Jean-Pierre Fleurial, Altadena, CA (US); Marc Rodriguez, Granada Hills, CA (US)

(73) Assignees: California Institute of Technology, Pasadena, CA (US); The Regents of the University of California, Oakland, CA (US)

(*) Notice: Subject to any disclaimer, the term of this patent is extended or adjusted under 35 U.S.C. 154(b) by 117 days.

(21) Appl. No.: 13/155,853

(22) Filed: Jun. 8, 2011

(65) Prior Publication Data

US 2011/0318250 A1   Dec. 29, 2011

Related U.S. Application Data

(60) Provisional application No. 61/352,499, filed on Jun. 8, 2010.

(51) Int. Cl.
- *C01B 33/02* (2006.01)
- *C01B 21/068* (2006.01)
- *C01B 33/06* (2006.01)
- *C22C 29/00* (2006.01)
- *C22C 35/00* (2006.01)

(52) U.S. Cl.
USPC ............................ 423/349; 423/344; 420/578

(58) Field of Classification Search
USPC ............................ 423/344, 349, 350; 420/578
See application file for complete search history.

(56) References Cited

U.S. PATENT DOCUMENTS

2008/0023070 A1* 1/2008 Sinha .......................... 136/261
2012/0138843 A1   6/2012 Fleurial et al.

FOREIGN PATENT DOCUMENTS

WO   WO2008/034578      3/2008
WO   WO 2008034578 A1 *   3/2008

OTHER PUBLICATIONS

Bux et al., "Rapid Solid State Synthesis of Nanostructured Silicon," Chem. Mater., 2010, 22, 2534-2540. Published online Mar. 16, 2010.*

Gillan et al., "Synthesis of Refractory Ceramics via Rapid Metathesis Reactions between Solid-State Precursors," Chem Mater. 1996, 8, 333-343.*

Yang et al., "Synthesis of Alkyl-Terminated Silicon Nanoclusters by a Solution Route," J. Am. Chem. Soc., 1999, 121, 5191-5195.*

Liu et al., "A new synthetic routhe for the synthesis of hydrogen terminated silicon nanoparticles," Materials Science and Engineering B96 (2002) 72-75.*

Hick, et al., "Mechanochemical Synthesis of Alkaline Earth Carbides and Intercalation Compounds," Inorg Chem., vol. 48, pp. 2333-2338 (2009).

(Continued)

*Primary Examiner* — Anthony J Zimmer
(74) *Attorney, Agent, or Firm* — One LLP

(57) ABSTRACT

Methods for producing nanostructured silicon and silicon-germanium via solid state metathesis (SSM). The method of forming nanostructured silicon comprises the steps of combining a stoichiometric mixture of silicon tetraiodide ($SiI_4$) and an alkaline earth metal silicide into a homogeneous powder, and initating the reaction between the silicon tetraiodide ($SiI_4$) with the alkaline earth metal silicide. The method of forming nanostructured silicon-germanium comprises the steps of combining a stoichiometric mixture of silicon tetraiodide ($SiI_4$) and a germanium based precursor into a homogeneous powder, and initiating the reaction between the silicon tetraiodide ($SiI_4$) with the germanium based precursors.

29 Claims, 10 Drawing Sheets

(56) References Cited

OTHER PUBLICATIONS

Boukai, et al., *Silicon nanowires as efficient thermoelectric materials*, Nature 2008, 451(7175), 168-171.

Bux et al., *Nanostructured Bulk Silicon as an Effective Thermoelectric Material*, Adv. Funct. Mater., 2009, 19(15), 2445-2452.

Hochbaum et al., *Enhanced thermoelectric performance of rough silicon nanowires*, Nature 2008, 451(7175) 163-167.

Neiner, et al., *Low-Temperature Solution Route to Macroscopic Amounts of Hydrogen Terminated Silicon Nanoparticles*, J. Am. Chem. Soc. 2006, 128, 11016-11017.

Werwa et al., *Synthesis and processing of silicon nanocrystallites using a pulsed laser ablation supersonic expansion method*, Appl. Phys. Lett. 1994, 64(14), 1821-1823.

Xu et al., *Self-organized vertically aligned single-crystal silicon nanostructures with controlled shape and aspect ratio by reactive plasma etching*, Appl. Phys. Lett. 2009, 95(11) 111505-3.

Zhang et al, *Synthesis of Ordered Single Crystal Silicon Nanowire Arrays*, Adv. Mater. 2001, 13(16), 1238-1241.

U.S. Appl. No. 13/156,033, Ex-Parte Quayle, Office Action, Mar. 6, 2013.

* cited by examiner

RAPID SOLID-STATE METATHESIS ROUTES TO NANOSTRUCTURED SILICON-GERMAINUM

CROSS-REFERENCE TO RELATED APPLICATIONS

This application claims priority from provisional patent application U.S. Ser. No. 61/352,499 entitled "RAPID SOLID-STATE METATHESIS ROUTES TO NANOSTRUCTURED SILICON-GERMANIUM," filed Jun. 8, 2010 hereby incorporated by reference.

This invention was made with Government support under Grant No. 1308818, awarded by the Jet Propulsion Laboratory/NASA, Grant No. NNX09AM26H awarded by NASA, and Grant No. 0805357 awarded by the National Science Foundation. The Government has certain rights in this invention

FIELD

The present disclosure relates generally to nanostructured silicon and silicon-germanium, and more particularly to methods of producing nanostructured silicon and silicon-germanium via solid state metathesis (SSM).

BACKGROUND

Nanostructured silicon and silicon-germanium are attractive materials for a variety of applications due to their abundance, stability and low toxicity. Recently, nanostructured silicon and silicon-germanium have been utilized in several applications from thermoelectrics, photovoltaics, solar cell batteries and biological imaging. Several methods exist for producing silicon, such as the pyrolysis of silane, pulsed laser ablation, MOCVD, MBE, plasma etching and electrochemistry. However, these aforementioned methods are inherently limited due to the expense, complex equipment, toxic precursors and difficulty of scaling up the reactions to produce on a commercial scale. An alternative method of producing nanostructured silicon involves a solution-based synthetic technique. The drawback of the solution-based synthetic technique is the use of a long chain hydrocarbon capping ligand necessary to prevent particle agglomeration. The capping ligand, however, adds additional processing steps prior to use of the nanostructured silicon for applications where electron transfer is critical, such as in thermoelectrics or in solar cells.

Thus, there is a need for a new method for producing nanostructured silicon and nanostructured silicon-germanium, which is relatively inexpensive, does not require expensive equipment or toxic precursors and is capable of being scaled-up efficiently to produce commercial amounts of the reaction product.

SUMMARY

The present disclosure relates generally to nanostructured silicon and silicon-germanium, and more particularly to methods of producing nanostructured silicon and silicon-germanium via solid state metathesis (SSM). The method of forming nanostructured silicon comprises the steps of combining a stoichiometric mixture of silicon tetraiodide ($SiI_4$) and an alkaline earth metal silicide into a homogeneous powder, and initiating the reaction between the silicon tetraiodide ($SiI_4$) with the alkaline earth metal silicide. The method of forming nanostructured silicon-germanium comprises the steps of combining a stoichiometric mixture of silicon tetraiodide ($SiI_4$) and a germanium-based precursor into a homogeneous powder, and initiating the reaction between the silicon tetraiodide ($SiI_4$) with the germanium-based precursors. Other systems, methods, features and advantages of the example embodiments will be or will become apparent to one with skill in the art upon examination of the following figures and detailed description.

BRIEF DESCRIPTION OF THE DRAWINGS

FIGS. 6a is an image of nanostructured germanium produced using a germanium-based precursor. FIG. 6b is an EDS image of the nanostructured germanium shown in FIG. 6a.

DETAILED DESCRIPTION

Figure 1:
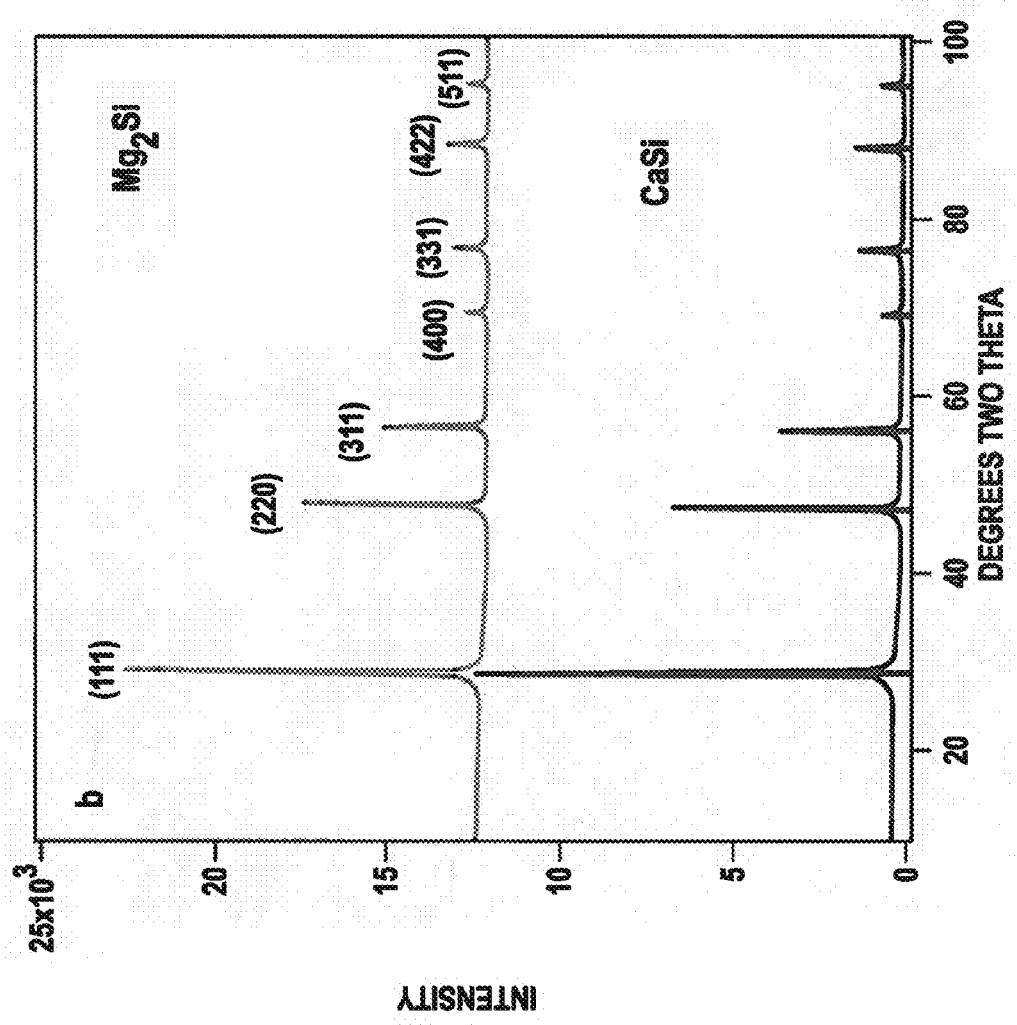
FIG. 1 is powder X-ray diffraction pattern of nanostructured Si made from $SiI_4$ using (a) CaSi and (b) $Mg_2Si$.

The term, "EDS," as used herein refers to energy dispersive spectroscopy, which is an analytical technique used for the elemental analysis or chemical characterization of a sample.

As used herein, the term "nanoparticle" is a microscopic particle with at least one dimension less than 100 nm. Nanoparticle can comprise multiple configurations or morphology and be referred to synonymously with the terms nanopowder, nanocluster, nanocrystal or nanowires.

The term, as used herein, "nanowire" is a nanostructure or nano-morphology, with the diameter of the order of a nanometer ($10^{-9}$ meters). Alternatively, nanowires can be defined as structures that have a thickness or diameter constrained to tens of nanometers or less and an unconstrained length. Typical nanowires exhibit aspect ratios (length-to-width ratio) of 1000 or more.

As used herein "Powder X-ray Diffraction" refers to a scientific technique using X-ray, on powder samples for structural characterization of materials. In the example embodiments, the dried products were examined by powder X-ray diffraction (XRD) using a PANalytical Powder X-ray diffractometer using Cu Kα (A=1.5408 Å) radiation. The X-ray scans were conducted with a range of $10° \leq \theta \leq 100°$ at 0.033 degree intervals and 25.13 second count times.

The term, "precursor," as used herein, is a compound that participates in the chemical reaction that produces another compound. The precursors used in the methods of the present embodiments include, but are not limited to, alkaline earth silicide precursors ($Mg_2Si$ or CaSiMg, or $CaSi_2$); germanium-based precursors ($Mg_2Ge$ or $GeI_4$); alkali silicides or germanides ($Li_2Si$ or $Na_2Si$) and the like.

As used herein the "SAD" or "SAED" refers to the selected area (electron) diffraction, which is a crystallographic experimental technique that can be performed inside a transmission electron microscope (TEM).

The term "SEM" as used herein refers to a scanning electron microscope, which is a type of electron microscope that images a sample by scanning it with a high-energy beam of electrons in a raster scan pattern. In the example embodiments, the field emission scanning electron microscopy images were obtained with a JEOL JSM-6401F SEM and an FEI NOVA SEM operated with a 7-10 kV accelerating voltage. However, one skilled in the art understands that comparable SEM's can be utilized to produce similar images.

As used herein, the term "solid state metathesis" or "SSM" refers to the method of synthesizing compounds from two solids where one portion of one molecule is transferred to the other molecule. In the present embodiments, SSM reactions are highly exothermic double displacement reactions, driven by not only the formation of the product but the thermodynamically favorable formation of a salt. The salt is washed away with water or acid leaving behind the desired product. The SSM reactions in present embodiments can utilize two metathesis initiation techniques, such as resistivity heated nichrome wire initiation, or can be initiated mechanochemically by a high-energy ball mill.

The term, TEM, as used herein refers to transmission electron microscopy, which is a microscopy technique whereby a beam of electrons is transmitted through an ultra thin specimen, interacting with the specimen as it passes through. An image is formed from the interaction of the electrons transmitted through the specimen; the image is magnified and focused onto an imaging device, such as a fluorescent screen, on a layer of photographic film, or to be detected by a sensor such as a CCD camera. In the example embodiments, nanosilicon samples were dispersed in ethanol and then pipetted onto a lacy carbon grid (SPI products). TEM imaging of the nanosilicon powders was performed on a FEI TF30UT TEM at 300 kV using a field emission gun with an ultra-twin lens. For the $Mg_2Si$ nanowires a FEI CM120 TEM at 300 kV using a field emission gun was used to image. However, one skilled in the art understands that comparable TEM's techniques can be utilized to produce similar images.

The present embodiments relate to methods for producing unfunctionalized nanostructured silicon and nanostructure silicon-germanium via solid state metathesis (SSM). Phase-pure nanostructured silicon is produced rapidly by reacting silicon tetraiodide ($SiI_4$) with a precursor, such as an alkaline earth metal silicide such as magnesium silicide ($Mg_2Si$) or calcium silicide (CaSi).

The significant advantage of the methods of the present embodiments over the current techniques is that the methods of the present embodiments can rapidly produce unfunctionalized nanostructured silicon and nanostructured silicon-germanium without the need for complex equipment. Another advantage of the methods of the present embodiments is that they are easily and efficiently scaled to produce commercial amounts of the nanostructured reaction product. Additionally, the methods of the present embodiments can be controlled to result in specific morphologies of nanostructured silicon and nanostructured silicon-germanium by simply changing the precursor. Due to the fact that SSM reactions only use solid state precursors, there is no need to add an organic capping ligand to prevent particle agglomeration. Thus, the end product of a SSM reaction does not have a carbon-based capping ligand and the resultant end product of the methods of the present embodiments are ideal materials for electron transfer applications, such as thermoelectrics or solar cells. Another advantage of the SSM approach is that the particle size of the resultant can be controlled by the temperature of the reaction by the addition of an inert material, such as a salt, to dissipate the heat.

The methods of the present embodiments have an advantage over the current method because the methods can be scaled up from milligram quantities to gram scale reactions, since these SSM reactions can be initiated mechanochemically by a high-energy ball mill. Another advantage of the ball milling initiation method is that all of the reactants can be consumed during the reaction due to the continuous injection of energy into the reaction. One problem with other metathesis initiation techniques, such as resistivity heated nichrome wire initiation, is that it often leads to incomplete reaction propagation and a significant amount of the starting material remains.

A significant feature of the method described herein is the solid state metathesis reaction between precursors and silicon tetraiodide ($SiI_4$). In one embodiment, an alkaline earth silicide precursor ($Mg_2Si$ or CaSi or $CaSi_2$) is reacted with silicon tetraiodide ($SiI_4$). In other embodiments, other compounds and alloys such as nanostructured germanium and nanostructured silicon-germanium can be produced utilizing other precursors.

The idealized reactions between silicon tetraiodide and the alkaline earth silicide precursors are:

$$2CaSi(s) + SiI_4(s) \rightarrow 3Si(s) + 2CaI_2(s) \tag{1}$$

$$Mg_2Si(s) + SiI_4(s) \rightarrow 2Si(s) + 2MgI_2(s) \tag{2}$$

When the two reactants, shown in reactions 1 and 2 are homogenously mixed and initiated, a double displacement reaction occurs yielding nanostructured silicon and a salt as the end products. The salts in the respective reactions, $2CaI_2(s)$ and $2MgI_2(s)$, are washed away with either water or ethanol. Depending on which silicide precursor is used, two different morphologies are obtained, either nanoparticles or dendritic nanowires.

For the calcium silicide reactions, shown in reactions 1, which yield nanostructured silicon with the nanoparticle morphology, the reactions can either be initiated using a resistively heated nichrome wire or using the mechanochemical technique of high-energy ball milling. The nichrome wire is heated to a temperature of above 800° C. In the high-energy ball milling method, each of the reagents or chemicals is all added separately at one time and subsequently ball milled together.

For the magnesium silicide reaction, shown in reaction 2, which yields the nanowire morphology, the precursors are ball milled to obtain a high surface area and a homogenous reaction mixture. The actual reaction does not occur in the ball mill, but is initiated via a drop of ethanol. The mechanism by which the nanowire morphology is produced is speculated to be a two-step mass transfer kinetic process. The first step of the mass transfer kinetic process involves the ethanol droplet reacting with the high surface area $Mg_2Si$ precursor to oxidize it to MgO and $SiH_4$ (Equation 3):

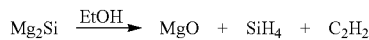 [3]

The first step of the mass transfer kinetic process involves the heat that is released from the oxidation of Mg$_2$Si to MgO and the combustion of silane and acetylene in turn decomposes the SiI$_4$ into Si and I$_2$ (Equation 4).

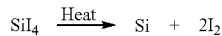 [4]

Figure 5:
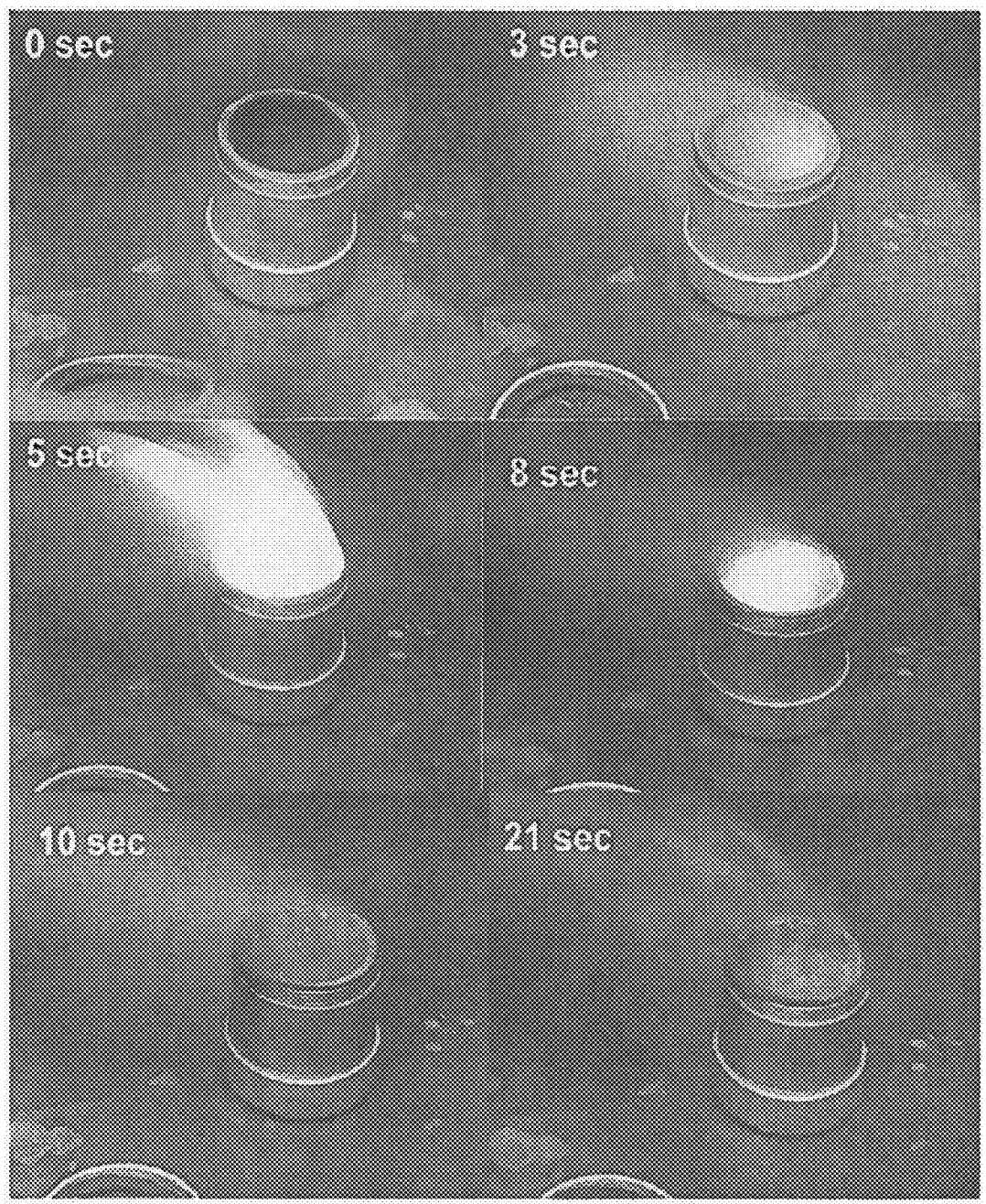
FIG. 5 is time-lapse photography images of the reaction between $Mg_2Si$ and $SiI_4$ initiated by a drop of ethanol.

The I$_2$ can then act as a vapor transport agent, forming nanowires on the cool walls of the container. Evidence for iodine vapor is provided by the violet colored plume emanating from the reaction vial five seconds after the reaction is initiated as shown in FIG. 5. The violet plume was confirmed to be iodine by conducting a starch-iodine test.

Ethanol is believed to play a crucial role in the process of forming the nanowires. Since all solid state reactions are limited by the rate of solid-solid diffusion, the ethanol molecule facilitates the metathesis reaction by interacting with the reactive Mg$_2$Si precursor. Approximately 200 microliters of ethanol is used to initiate the reaction. Additional variable amounts of ethanol, approximately 50 microliters, are used to wash off the salt from the reaction or end product. When ethanol is substituted with a more reactive and stronger oxidizing agent, such as 6.0 M hydrochloric acid, the silicon is rapidly oxidized and amorphous SiO$_2$ is formed. However, if a branched alcohol such as isopropanol is used, the reaction does not propagate and the precursor materials remain largely intact.

Oxygen is believed to play a crucial role in the process of forming the nanostructures. When the reaction is initiated using a water-free solvent, such as dimethylformamide under inert conditions, very few nanowires are obtained, suggesting that oxygen plays a crucial role in the formation of nanowires. Although the precise role of oxygen is not known, several studies suggest that oxygen facilitates nanowire formation as a nucleation point.

Salts are believed to play a role in reducing the crystalline size of the resultant product of a metathesis reaction. It is believed that the addition of an inert salt diluent, which acts as a heat sink retards Ostwald ripening. Examples of inert salt diluents are selected from the group consisting of sodium chloride (NaCl); potassium chloride (KCl); calcium chloride (CaCl$_2$) and lithium chloride (LiCl) and the like.

In other embodiments, the methods described herein can be used to produce other compounds and alloys with nanostructure, such as, nanostructured germanium and nanostructured silicon-germanium. Additionally, elemental germanium (Ge) or Tin (Sn) can be added directly to reactions 1 and 2 to make silicon-based composites or alloys. It is believed that the germanium (Ge) or tin (Sn) can also act as heat sinks to control the reaction temperature by dissipating the heat of the reactions.

The nanostructured germanium and nanostructured silicon-germanium is produced by simply using germanium-based precursors such as Mg$_2$Ge or GeI$_4$ (reaction 5).

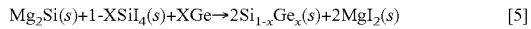 [5]

Nanostructured germanium can be produced by the following reaction (6):

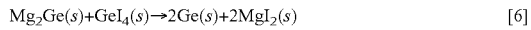 [6]

Additionally, a composite or an alloy can be made by a mixture of the germanide and silicide precursors (reaction 7):

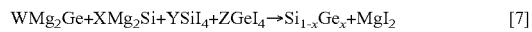 [7]

In addition, the method described herein can include the use of alkaline earth silicides (such as Mg$_2$Si and CaSi) and silicon tetraiodide, it could be expanded to utilize alkali based precursors such as alkali silicides or germanides (Li$_2$Si or Na$_2$Si) and other silicon tetrahalides (or germanium tetrahalides) such as SiCl$_4$ or SiBr$_4$.

Due to the fact that the end product is isolated in air, a native oxide layer may exist on the nanostructured silicon. However, the native oxide layer may be removed from the nanostructured end product by an etching treatment with hydrofluoric acid or a similar treatment known to one of ordinary skill in the art.

EXAMPLE EMBODIMENTS

The example embodiments are made using the following reagants: SiI$_4$ (99% available from Alfa Aesar, Ward Hill, Mass.), CaSi (99.5% available from GFS Chemicals, Inc. Powell, Ohio), CaSi$_2$ (95% available from Strem Chemicals, Inc. Newburyport, Mass.), Mg$_2$Si (99.5% available from Materion Corporation, Mayfield Heights, Ohio) Mg$_2$Ge and GeI4 (Alfa AesarWard Hill, Mass.).

Example 1 illustrates the solid state metathesis of nanostructured silicon by reacting SiI$_4$ and 2CaSi. The reaction of Example 1 is performed using the following idealized reaction:

2CaSi(s)+SiI$_4$(s)→3Si(s)+2CaI$_2$(s) Stoichiometric mixtures of the precursor materials were ground to a homogeneous powder in an argon—or helium-filled glove box. The reactions in Example 1 are initiated using a resistively heated nichrome wire. For reaction using the nichrome initated method the precursor amounts were measured and have a total precursor mass of 2 grams (~0.25 g yield of the Si product via CaSi and CaSi$_2$ synthesis). The powders were then subjected to a resistively heated nichrome wire, which is heated to more than 800° C., to initiate the reaction. It is noted that solid state metathesis reactions are extremely exothermic and may initiate upon grinding. Safety precautions should be taken prior to conducting these types of reactions or when scaling up. The resultant product of the embodiment of Example 1 is characterized by one or more of the following techniques, including powder X-ray Diffraction; Scanning Electron Microscopy (SEM); Transmission Electron Microscopy (TEM); Energy dispersive spectroscopy (EDS) or selected area (electron) diffraction (SAED).

Figure 2:
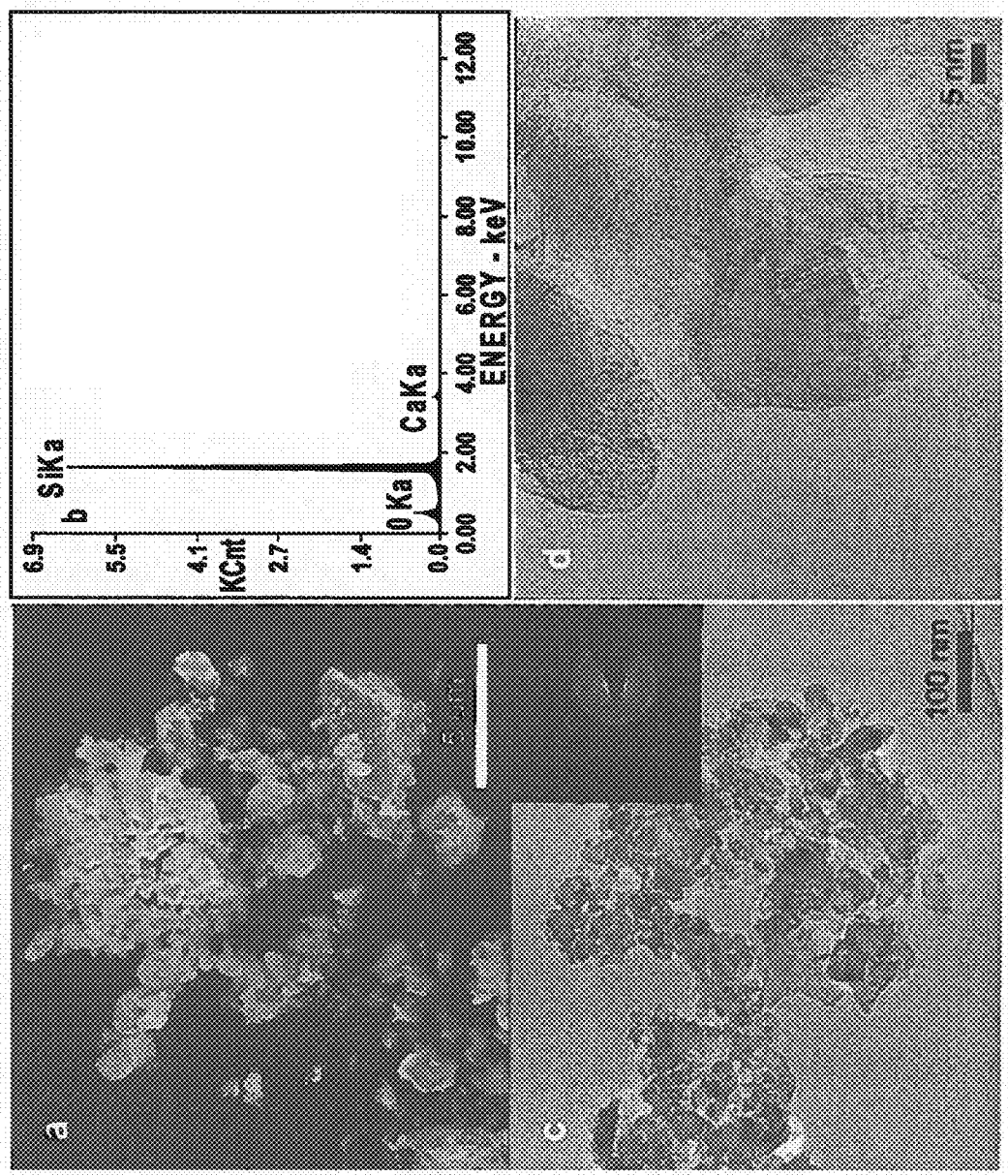
FIGS. 2a, 2c and 2d are images of nanostructured silicon produced from the solid state metathesis of $SiI_4$ and 2CaSi.
FIG. 2b is an EDS image of the nanostructured silicon shown in FIGS. 2a, 2c and 2d.

FIG. 1 illustrates the powder X-ray diffraction pattern of nanostructured Si made from SiI$_4$ using CaSi marked (a) at the bottom. The stick pattern overlay is the JCPDS file 00-027-1402 for silicon. FIGS. 2a, 2c and 2d are images of nanostructured silicon produced from the solid state metathesis of SiI$_4$ and 2CaSi. As shown in FIGS. 2a, 2c and 2d, the reaction of Example 1 yields the nanostructured silicon that comprises a nanoparticle morphology.

FIG. 2a is a SEM image of the dried product from the reaction of SiI$_4$ and CaSi, which shows aggregates of Si nanoparticles ranging from submicron to micron-sized particles. The EDS image in FIG. 2b, confirms that the end product is composed mainly of Si with some surface oxides and a slight Ca impurity. FIG. 2c is the transmission electron microscopy image demonstrating that the large silicon nanoparticles are actually aggregates of smaller Si nanoparticles ranging from 30 to 50 nm in size, which is in agreement with the crystallite size calculated from XRD. The TEM diffraction pattern inset confirms that the Si nanoparticles are crystalline in nature. It is believed that when the alkaline earth silicide precursor is changed from CaSi to $Mg_2Si$, there is a significant change in the morphology of the nanostructured Si product. The TEM images in FIG. 2c show that the large particles seen in SEM are actually aggregates of smaller Si particles. The inset shows a selected area electron diffraction pattern that confirms the product is nanocrystalline. The high resolution TEM in FIG. 2d shows lattice fringes indicating that the large particles are made up of smaller particles.

Examples 2, 3 and 4 are performed in the same manner as Example 1, with the addition of sodium chloride (NaCl) as the inert salt diluents to the reaction, as shown in Table 1, below. The reactions of Examples 2, 3 and 4 are performed utilizing the following idealized reaction:

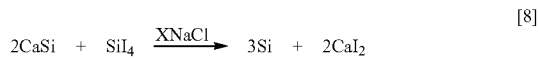

$$2CaSi + SiI_4 \xrightarrow{XNaCl} 3Si + 2CaI_2 \quad [8]$$

The amount of sodium chloride are varied in Examples 2, 3 and 4 as shown in

TABLE 1

Calculated crystallite size and temperature reduction for nanostructured silicon produced by the reaction between CaSi and $SiI_4$ with increasing molar equivalents of NaCl.

| Example # | Equivalents of NaCl (mol) | Crystallite Size (nm) | Temperature (K) |
|---|---|---|---|
| 1 | 0 | 36.2 | 2025 |
| 2 | 1 | 32.7 | 1708 |
| 3 | 2 | 30.8 | 1685 |
| 4 | 3 | 12.1 | 1543 |

Figure 4:
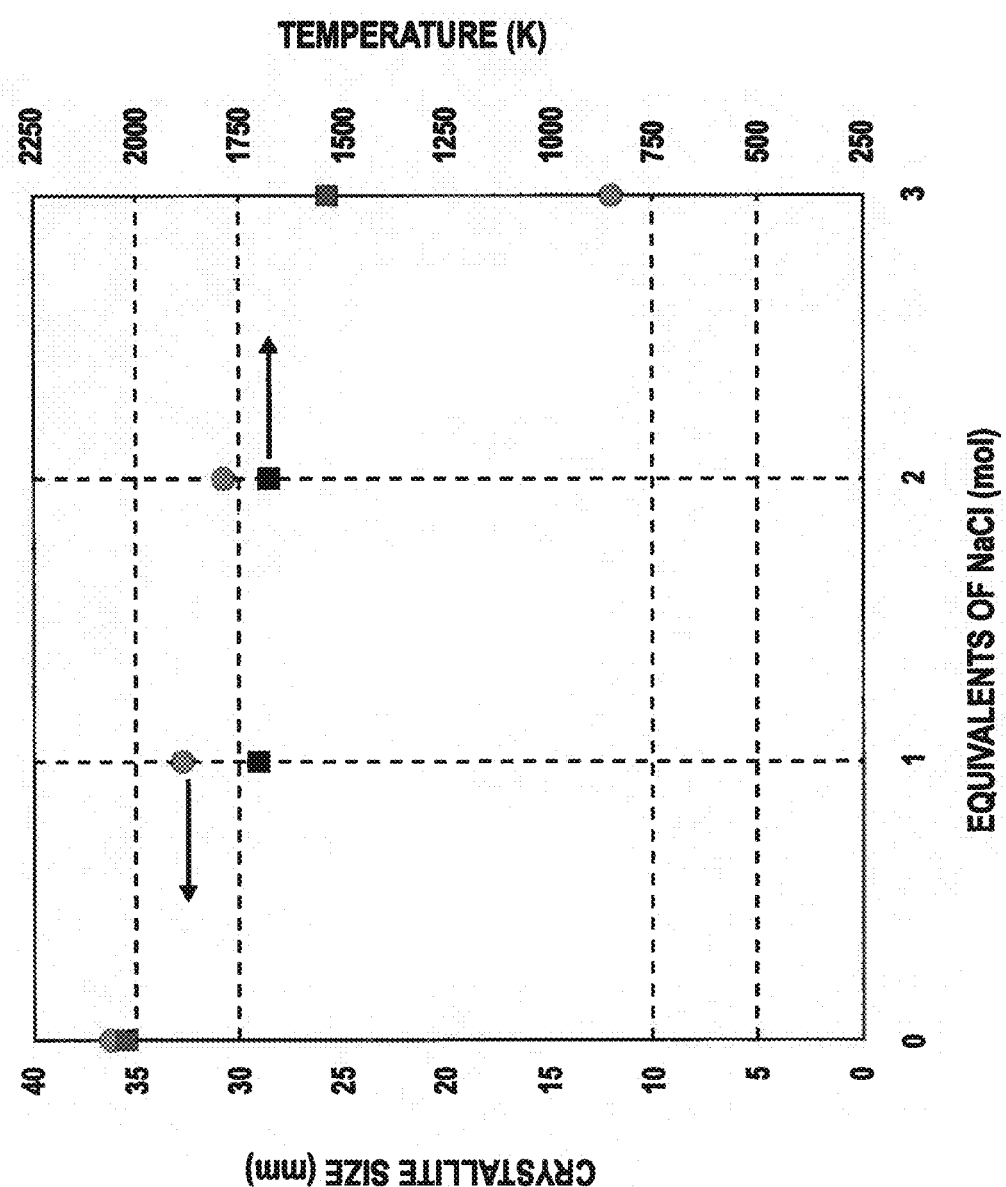
FIG. 4 illustrates crystallite size and calculated maximum adiabatic temperature as a function of NaCl addition moles according to the reaction of $SiI_4$ and 2CaSi.

FIG. 4 shows that with increasing salt concentration (X), the crystallite size decreases significantly from 36 nm down to about 12 nm. The addition of the inert salt acts as an aid to prevent grain coarsening and Ostwald ripening by acting as a heat sink. This is reflected in the decreased calculated maximum adiabatic temperature from 2050 to 1555 K—a result of the NaCl addition (FIG. 4). FIG. 4 illustrates crystallite size (circles) and calculated maximum adiabatic temperature (squares) as a function of NaCl addition (X) moles according to the reaction of $SiI_4$ and 2CaSi. The NaCl reduces the maximum adiabatic temperature by acting as a heat sink thus retarding Ostwald ripening, which keeps the crystallites small.

Example 5 illustrates the solid state metathesis of nanostructured silicon by reacting Mg2 and 2CaSi. The reaction of Example 5 is performed using the following idealized reaction:

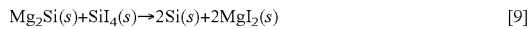

$$Mg_2Si(s)+SiI_4(s) \rightarrow 2Si(s)+2MgI_2(s) \quad [9]$$

For mechanochemically initiated reactions, the precursor material total mass was scaled up to 8 grams to yield 0.83 g of Si product via $Mg_2Si$ and 1.25 g of Si product via CaSi reactions. The reactants were loaded into tungsten carbide vials with several tungsten carbide balls (SPEX CertiPrep Inc., Metuchen, N.J.) and then loaded onto a Spex 8000D mixer mill (SPEX CertiPrep Inc., Metuchen, N.J.) and milled for several hours. In the synthesis involving $Mg_2Si$ and $SiI_4$, the precursor materials were ball milled to a homogeneous powder and the reaction was initiated using approximately 200 microliters of ethanol. It is also noted that solid state metathesis reactions are highly exothermic and should be handled in a fume hood or glove box. This step involves the evolution of molecular iodine. The final products were washed with 50% 6 M HCl/50% ethanol to remove the salt by-product, then washed with ethanol and finally dried in air. All three of the reactions had over 90% yield in the product. The resultant product of the embodiment described in Example 5 is characterized by one or more of the following techniques, including powder X-ray Diffraction; Scanning Electron Microscopy (SEM); Transmission Electron Microscopy (TEM); Energy dispersive spectroscopy (EDS) or selected area (electron) diffraction (SAED).

Figure 3:
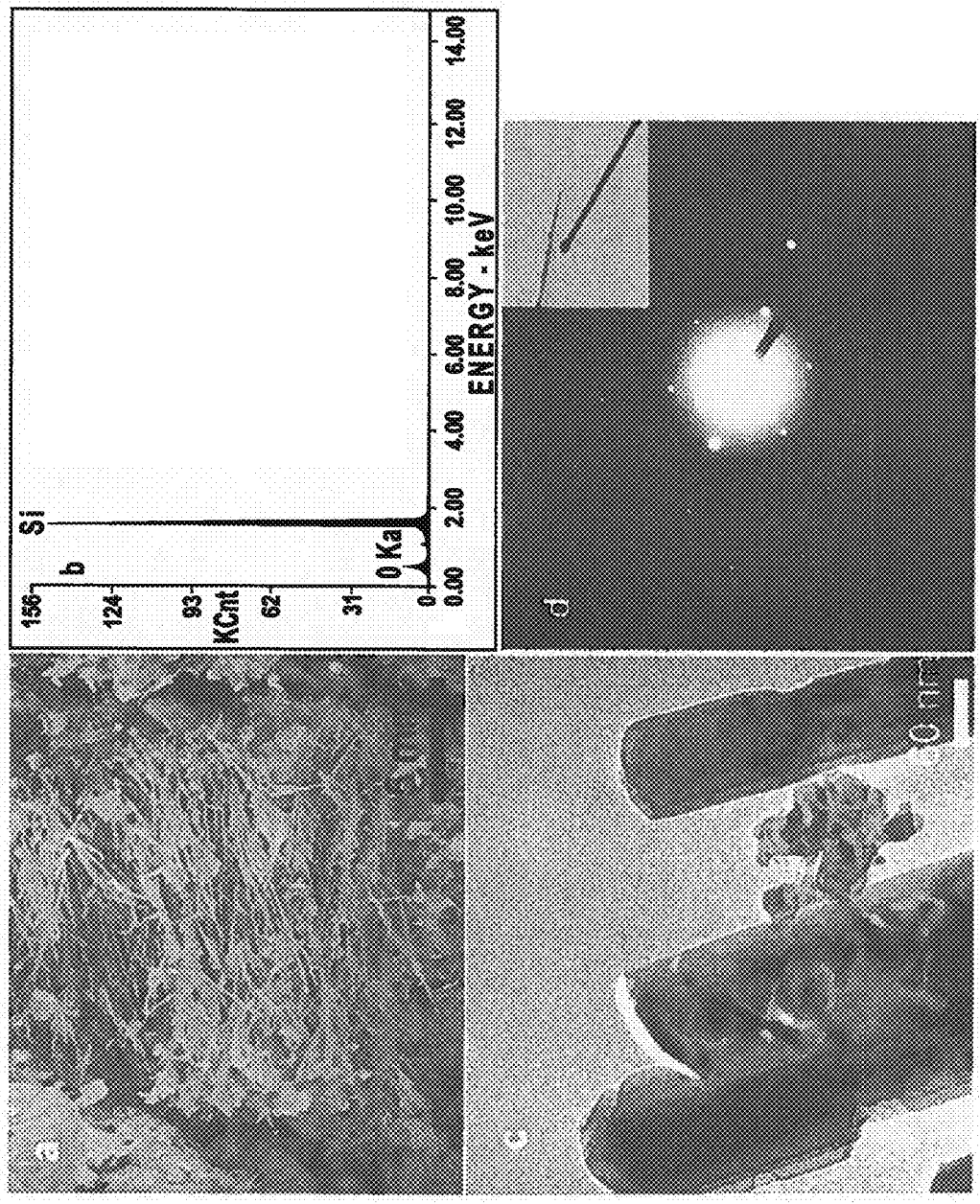
FIGS. 3a, 3c and 3d are images of nanostructured silicon produced from the solid state metathesis of $SiI_4$ and $Mg_2Si$.
FIG. 3b is an EDS image of the nanostructured silicon shown in FIGS. 3a, 3c and 3d.

FIG. 1 illustrates the powder X-ray diffraction pattern of nanostructured Si made from $SiI_4$ using $Mg_2Si$ marked (b). FIGS. 3a, 3c and 3d are images of nanostructured silicon produced from the solid state metathesis of $SiI_4$ and $Mg_2Si$. In the reaction of Example 5, the resultant nanostructured silicon has nanowire morphology.

FIG. 3a is an SEM image that shows nanowire bundles, several microns in size, that resemble groups of oriented dendritic wires composed of nanowires with diameters of approximately 50 nm. FIG. 3b is an EDS image of the nanostructured silicon shown in FIGS. 3a, 3c and 3d. A TEM image in FIG. 3c shows that the silicon nanowires are 40 nm in diameter with a 10 nm thick oxide layer, which is in agreement with the crystallite size calculated from XRD. Selected area electron diffraction (SAED) in FIG. 3d of the nanowires demonstrates that they are highly crystalline with a diffraction pattern oriented generally along the 111 direction. The silicon nanowires average 50 nm in diameter and the product is mainly Si with some oxygen and residual Mg. FIG. 3c is a TEM image of the silicon nanowires, the lighter area is believed to correspond to a 10 nm thick oxide layer on the nanowires. In FIG. 3d is the SAED pattern of the nanowires showing that they grow in the (111) direction. In order to form the Si nanowires, a drop of ethanol or approximately 500 microliter is used to initiate the reaction. FIG. 5 is time-elapsed photography images of a $Mg_2Si+SiI_4$ reaction. The ethanol droplet initiates the reaction and in less than 1 minute the reaction reaches completion. A large violet plume of iodine vapor is observed approximately 3 seconds into the reaction.

Example 6 illustrates the solid state metathesis of nanostructured germanium by reacting $Mg_2Si(s)+1-XSiI_4$. The reaction of Example 6 is performed using the following idealized reaction:

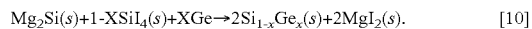

$$Mg_2Si(s)+1-XSiI_4(s)+XGe \rightarrow 2Si_{1-x}Ge_x(s)+2MgI_2(s). \quad [10]$$

For mechanochemically initiated reactions, the precursor material total mass was scaled up to 8 grams to yield 0.83 g of Si product via $Mg_2Si$ and 1.25 g of Si product via CaSi reactions. The amount of germanium used is 20% by mole of the reaction product that one is attempting to produce. The reactants were loaded into tungsten carbide vials with several tungsten carbide balls (SPEX CertiPrep Inc., Metuchen, N.J.) and then loaded onto a Spex 8000D mixer mill (SPEX CertiPrep Inc., Metuchen, N.J.) and milled for several hours. In the synthesis involving $Mg_2Si$ and $SiI_4$, the precursor materials were ball milled to a homogeneous powder and the reaction was initiated using a drop of ethanol. It is also noted that solid state metathesis reactions are highly exothermic and should be handled in a fume hood or glove box. This step involves the evolution of molecular iodine. The final products were washed with 50% 6 M HCl/50% ethanol to remove the salt by-product, then washed with ethanol and finally dried in air. All three of the reactions had over 90% yield in the product.

Figure 6:
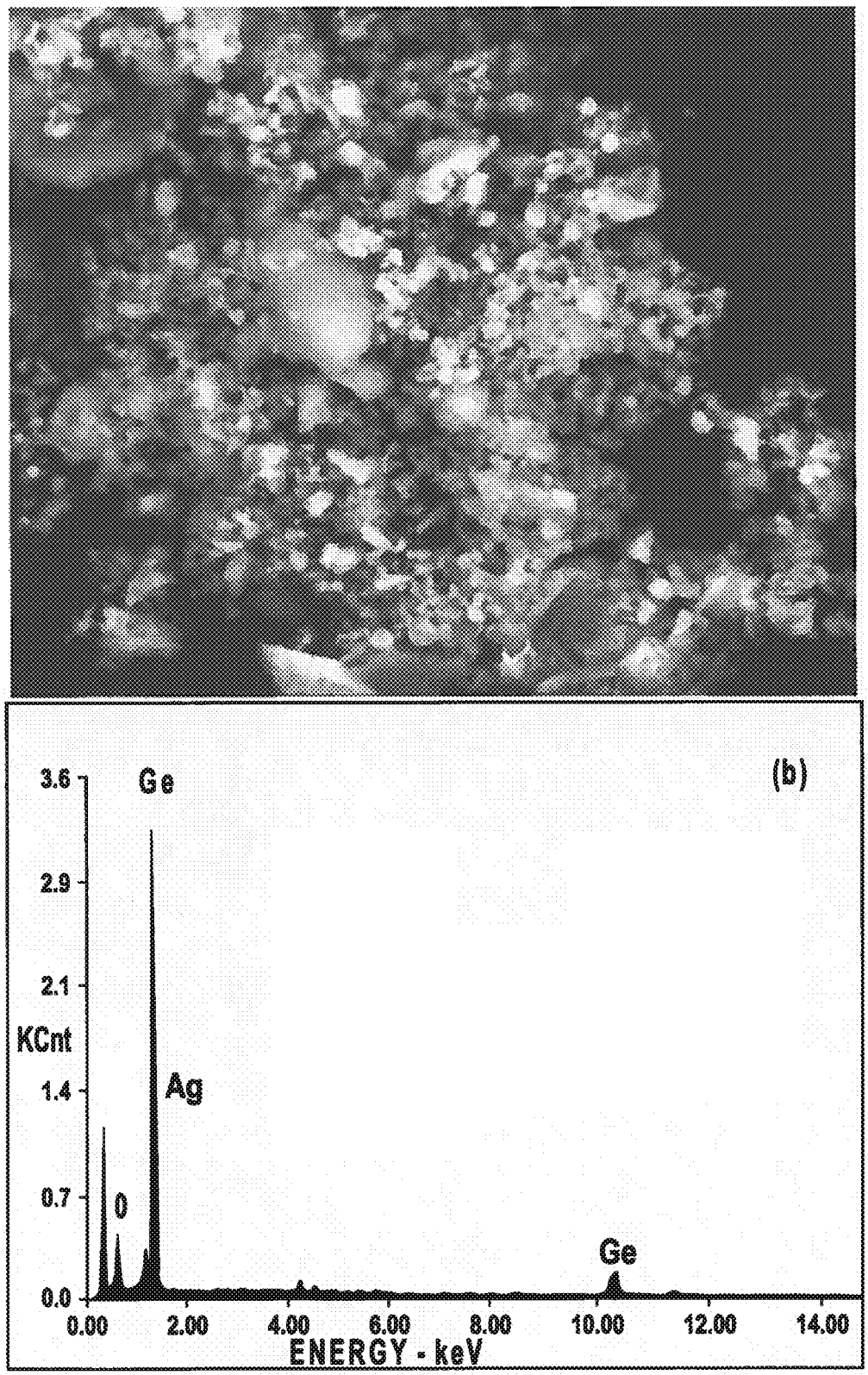

FIGS. 6a and 6b are images of nanostructured germanium produced using Mg$_2$Ge as a germanium-based precursor. FIG. 6a is a SEM that shows germanium nanoparticles. The EDS image in FIG. 6b, confirms that the end product is composed mainly of germanium (Ge) and a slight Magnesium (Mg) impurity.

Example 7 illustrates solid state metathesis of nanostructured silicon-germanium by using elemental germanium in the reaction of SiI$_4$ and 2CaSi. The reaction of Example 7 is performed using the following idealized reaction:

$$2CaSi(s)+SiI_4(s)+Ge \rightarrow 3Si(s)+2CaI_2(s) \quad [11]$$

The reaction of Example 7 is performed in the same manner as Example 1, with the addition of germanium to the reaction. The amount of germanium used is 20% by mole of the reaction product that one is attempting to produce.

Figure 7:
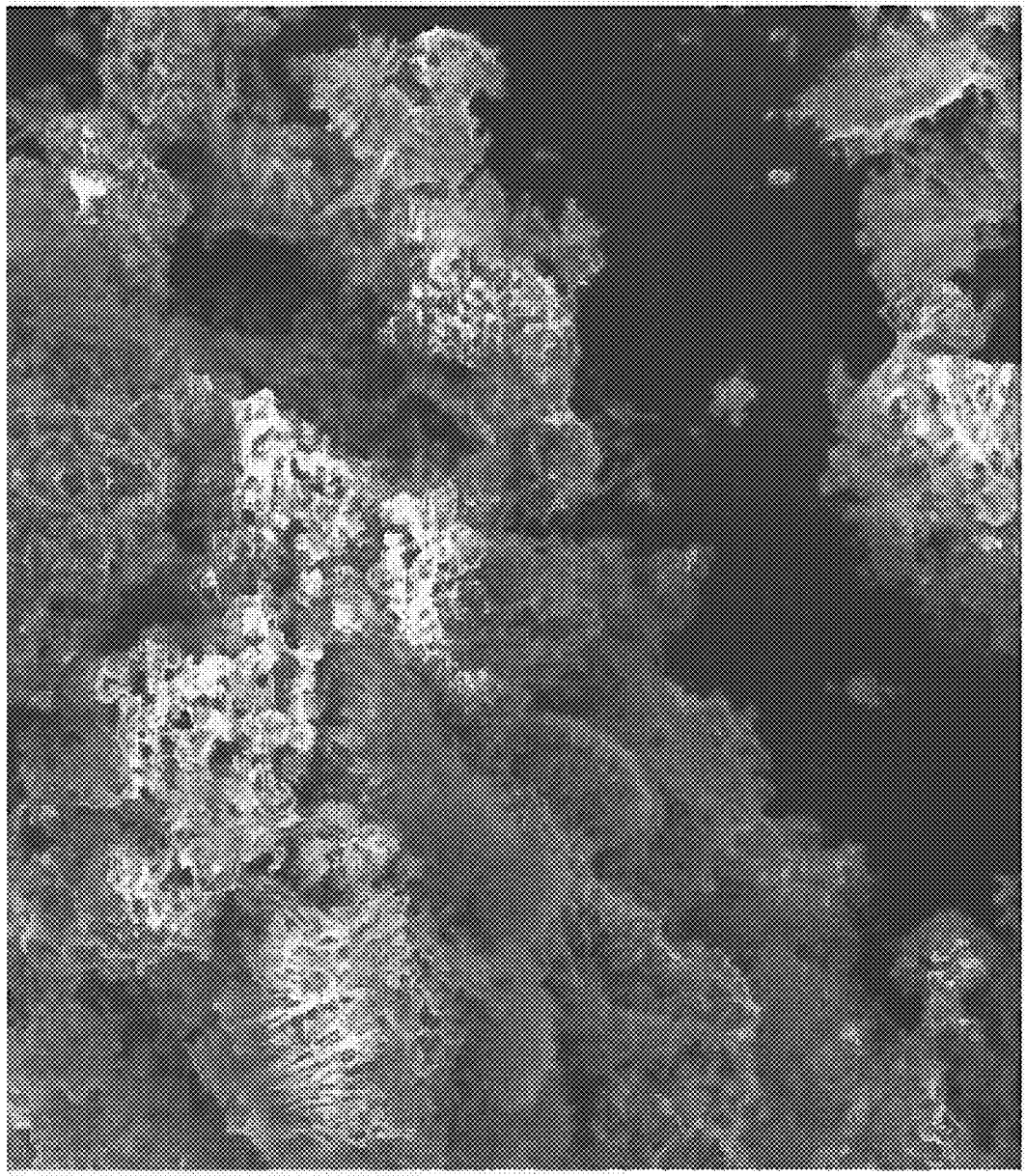
FIG. 7 is an SEM image of nanostructured silicon-germanium using germanium in the solid state metathesis reaction of $SiI_4$ and 2CaSi.

FIG. 7 is an SEM of nanostructured silicon-germanium produced using germanium in the solid state metathesis reaction of SiI$_4$ and 2CaSi. The SEM image in FIG. 7 shows the nanostructure of the silicon is nanowire morphology. It is believed that the added elemental germanium is acting as a heat sink to control the reaction temperature by dissipating the heat of reaction, thus, more time for nanowire formation.

Figure 8:
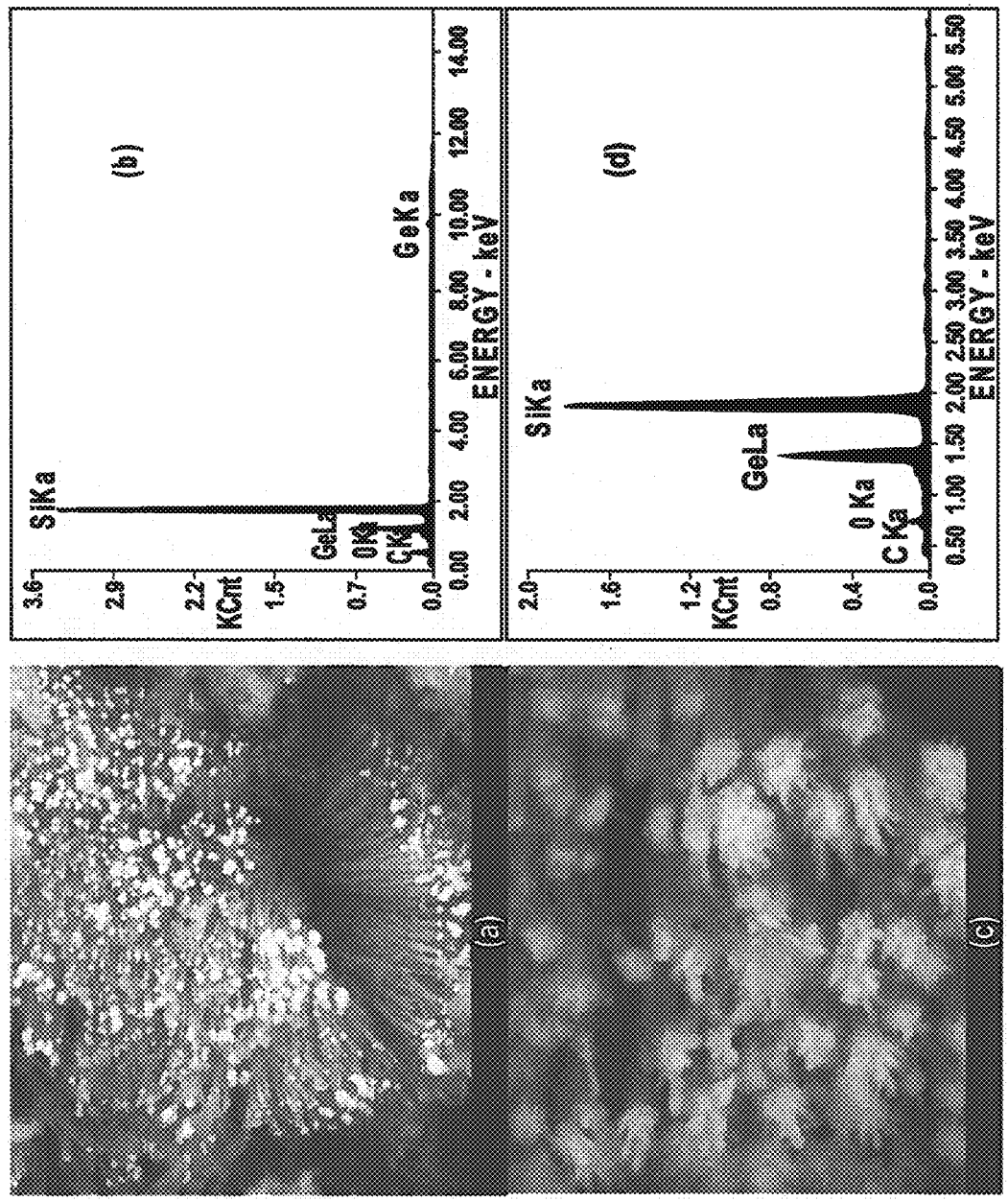
FIGS. 8a and 8d are images of nanostructured silicon-germanium using germanium in the solid state metathesis reaction of $SiI_4$ and 2CaSi.
FIGS. 8b and 8c are EDS images of the nanostructured silicon-germanium shown in FIGS. 8a and 8d.

FIGS. 8a and 8c are images of the nanostructured silicon-germanium produced using germanium in the solid state metathesis reaction of SiI$_4$ and 2CaSi. FIGS. 8a and 8c are SEM images showing a nanowire morphology. The EDS images in FIGS. 8b and 8d, confirm that the end product is composed mainly of silicon-germanium.

Example 8 illustrates solid state metathesis of nanostructured silicon-germanium produced adding elemental tin (Sn) to the reaction of SiI$_4$ and 2CaSi. The reaction of Example 8 is performed using the following idealized reaction:

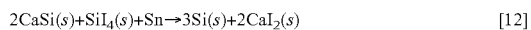

$$2CaSi(s)+SiI_4(s)+Sn \rightarrow 3Si(s)+2CaI_2(s) \quad [12]$$

The reaction of Example 8 is performed in the same manner as Example 1 with the addition of tin (Sn) to the reaction. The amount of germanium used is 20% by mole of the reaction product that one is attempting to produce.

Figure 9:
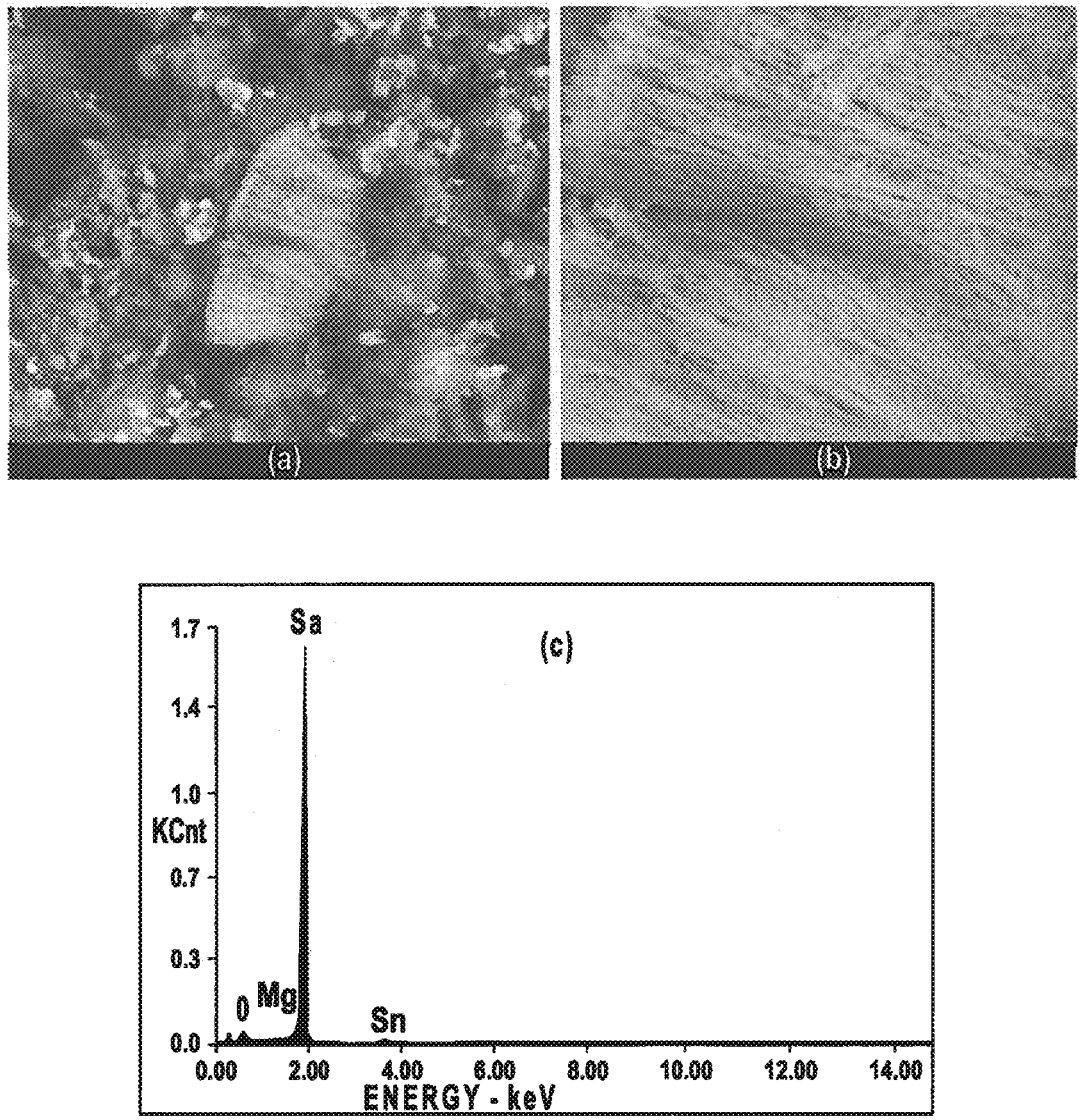
FIGS. 9a and 9b are images of nanostructured silicon using tin in the solid state metathesis of $SiI_4$ and 2CaSi.
FIG. 9c is an EDS image of the nanostructured silicon shown in FIGS. 9a and 9b.

FIGS. 9a and 9b are images of nanostructured silicon using tin in the solid state metathesis of SiI$_4$ and 2CaSi. FIGS. 9a and 9b are SEM images that show that the nanostructure of the silicon is nanowire morphology. It is believed that the added elemental tin is acting as a heat sink to control the reaction temperature by dissipating the heat of reaction. The EDS image in FIG. 9c, confirms that the end product is composed mainly of Si with some surface oxides and a slight Sn impurity.

Example 9 illustrates the solid state metathesis of nanostructured silicon-germanium by reacting Mg$_2$Si(s)+1-XSiI$_4$. The reaction of Example 9 is performed using the following idealized reaction:

$$Mg2Si+1Mg2Ge+2SiI4 \rightarrow 3Si+1Ge+4MgI2 \quad [13]$$

In the magnesium silicide reaction, the precursors are ball milled to obtain a high surface area and a homogenous reaction mixture. For mechanochemically initiated reactions, the precursor material total mass was scaled up to 8 grams to yield 0.83 g of Si product via Mg$_2$Si and 1.25 g of Si product via CaSi reactions. The amount of germanium used is 20% by mole of the reaction product that one is attempting to produce. The reactants were loaded into tungsten carbide vials with several tungsten carbide balls (SPEX CertiPrep Inc., Metuchen, N.J.) and then loaded onto a Spex 8000D mixer mill (SPEX CertiPrep Inc., Metuchen, N.J.) and milled for several hours. In the synthesis involving Mg$_2$Si and SiI$_4$, the precursor materials were ball milled to a homogeneous powder and the reaction was initiated using a drop of ethanol. It is also noted that solid state metathesis reactions are highly exothermic and should be handled in a fume hood or glove box. This step involves the evolution of molecular iodine. The final products were washed with 50% 6 M HCl/50% ethanol to remove the salt by-product, then washed with ethanol and finally dried in air. All three of the reactions had over 90% yield in the product.

The resultant product of the embodiment described in Example 9 is characterized by one or more of the following techniques, including powder X-ray Diffraction; Scanning Electron Microscopy (SEM); Transmission Electron Microscopy (TEM); Energy dispersive spectroscopy (EDS) or selected area (electron) diffraction (SAED).

Figure 10:
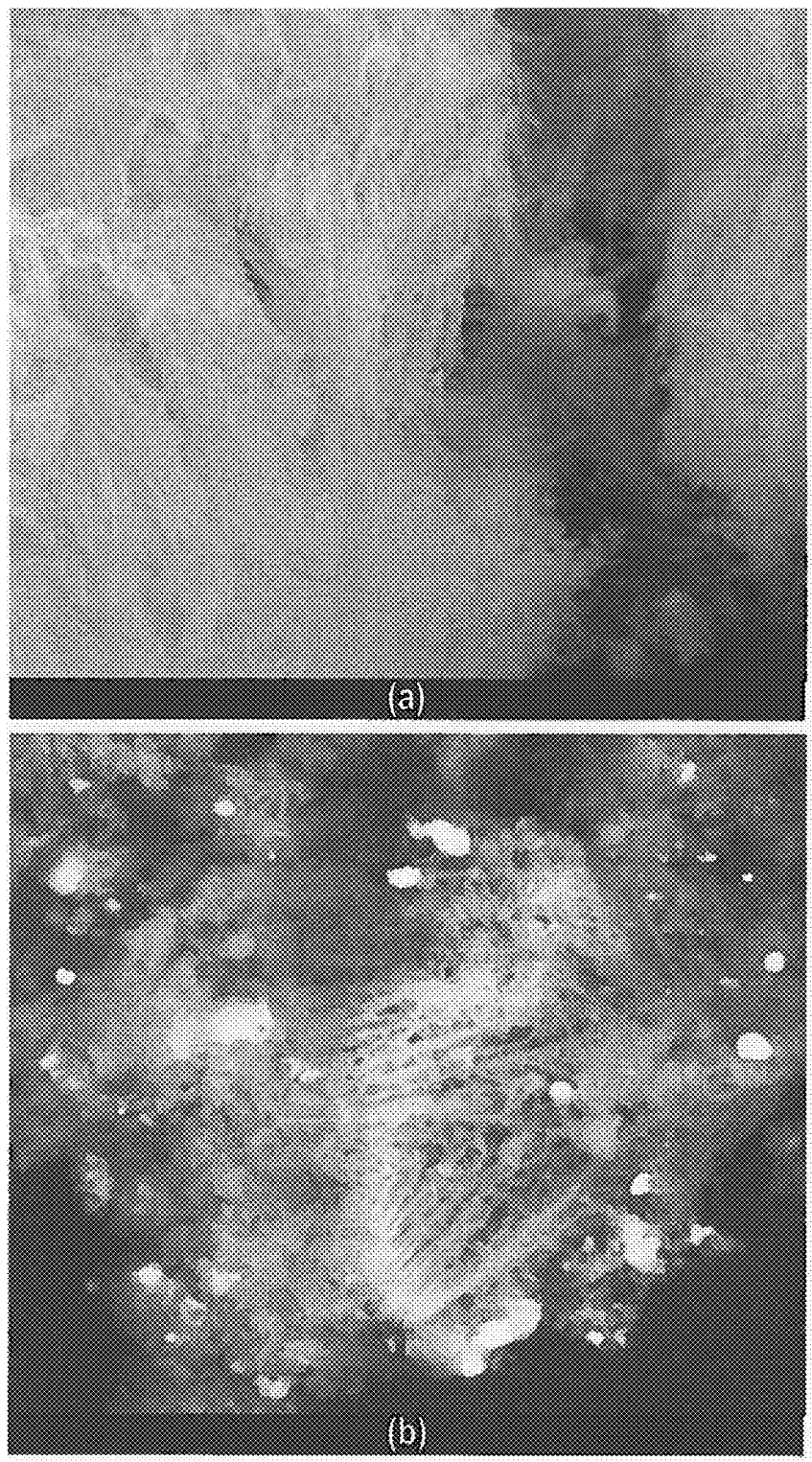
FIGS. 10a and 10b are images of nanostructured silicon-germanium produced using a germanium-based precursor.

FIGS. 10a and 10b are images of nanostructured silicon-germanium produced using a germanium based precursor. FIG. 10a shows that the nanostructure of silicon-germanium is a nanowire morphology. The bright spots in the SEM image of FIG. 10b are germanium.

All documents cited in the Detailed Description are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the scope of the invention. It is therefore intended to cover in the appended claims all such changes and modifications that are within the use.

What is claimed is:

1. A method of forming nanostructured silicon comprising the steps of:
    (a) combining a stoichiometric mixture of silicon tetraiodide SiI$_4$ and an alkaline earth metal silicide into a homogeneous powder, and
    (b) initiating the reaction between the silicon tetraiodide SiI$_4$ with the alkaline earth metal silicide.

2. The method of claim 1, wherein the alkaline earth metal silicide is selected from the group consisting of: Mg$_2$Si, CaSi$_2$, and CaSi.

3. The method of claim 2, wherein the initiating the reaction of the SiI$_4$ with the Mg$_2$Si step comprises adding a predetermined amount of ethanol.

4. The method of claim 3, wherein the initiating the reaction of the SiI$_4$ with the CaSi step comprises ball milling the SiI$_4$ and CaSi together.

5. The method of claim 2, wherein the initiating the reaction of the SiI$_4$ with the CaSi step comprises resistively heating the powder using a nichrome wire.

6. The method of claim 1, wherein the nanostructured silicon formed by the method comprises a morphology selected from the group consisting of nanoparticles, nanopowders, nanoclusters, nanocrystals, nanowires and mixtures thereof.

7. The method of claim 1, wherein the method further comprises the step of washing a salt by-product from the nanostructured silicon with a solution selected from the group consisting of water, alcohol and mixtures thereof.

8. The method of claim 1, wherein the method further comprises the step of etching a native oxygen layer from the nanostructured silicon by using a treatment comprising hydrofluoric acid.

9. A method of forming nanostructured silicon comprising the steps of:

(a) grinding a stoichiometric mixture of silicon tetraiodide $SiI_4$ and an alkaline earth metal silicide into a homogeneous powder, and
(b) reacting the silicon tetraiodide $SiI_4$ with the alkaline earth metal silicide.

10. The method of claim 9 wherein the alkaline earth metal silicide is selected from the group consisting of $Mg_2Si$, $CaSi_2$, and CaSi.

11. The method of claim 10 wherein the step of reacting the $SiI_4$ with the CaSi comprises resistively heating the powder using a nichrome wire.

12. The method of claim 10, wherein the step of reacting the $SiI_4$ with the $Mg_2Si$ comprises adding a predetermined amount of ethanol.

13. The method of claim 10, wherein the step of reacting the $SiI_4$ with the CaSi comprises ball milling the $SiI_4$ and CaSi together.

14. A method of forming nanostructured silicon comprising the step of
(a) ball milling a mixture of silicon tetraiodide $SiI_4$ and an alkaline earth metal silicide into a homogeneous powder, and
(b) reacting the silicon tetraiodide $SiI_4$ with the alkaline earth metal.

15. The method of claim 14 wherein the alkaline earth metal silicide is selected from the group consisting of $Mg_2Si$, $CaSi_2$, and CaSi.

16. The method of claim 15 wherein the step of reacting the $SiI_4$ with the $Mg_2Si$ comprises adding a predetermined amount of ethanol.

17. A method of forming nanostructured silicon-germanium comprising the steps of:
(a) combining a stoichiometric mixture of $SiI_4$ and a germanium based precursor into a homogeneous powder, and
(b) initiating the reaction between the $SiI_4$ and the germanium based precursor.

18. The method of claim 17, wherein the germanium based precursor is selected from the group consisting of $Mg_2Ge$ and $GeI_4$.

19. The method of claim 17, wherein the combining step (a) comprises grinding the stoichiometric mixture of $SiI_4$ and an germanium based precursor into a homogeneous powder.

20. The method of claim 17, wherein the grinding the stoichiometric mixture of $SiI_4$ and an germanium based precursor into a homogeneous powder is done in a glove box filled with argon and helium.

21. The method of claim 17, wherein the combining step (a) comprises ball milling the mixture of silicon tetraiodide and the germanium based precursor into a homogeneous powder.

22. The method of claim 17, wherein the initiating the reaction of the $SiI_4$ with the germanium based precursor comprises step comprises resistively heating the homogenous powder using a nichrome wire.

23. The method of claim 17, wherein the initiating the reaction of the $SiI_4$ with the germanium based precursor comprises step comprises adding a predetermined amount of ethanol.

24. The method of claim 17 wherein the nanostructured silicon-germanium formed by the method comprises a morphology selected from the group consisting of nanoparticles, nanopowders, nanoclusters, nanocrystals, nanowires and mixtures thereof.

25. The method of claim 17, wherein the method further comprises the step of washing a salt by-product from the nanostructured silicon-germanium with a solution selected from the group consisting of water, alcohol and mixtures thereof.

26. The method of claim 17, wherein the method further comprises the step of etching a native oxygen layer from the nanostructured silicon by using a treatment comprising hydrofluoric acid.

27. A method of forming nanostructured silicon comprising the steps of:
(a) combining a stoichiometric mixture of $SiI_4$ and an alkaline earth metal silicide into a homogeneous powder,
(b) adding tin to the homogeneous powder, and
(c) initiating a reaction between the $SiI_4$ and the alkaline earth metal silicide.

28. A method of forming nanostructured silicon comprising the steps of:
(a) grinding a stoichiometric mixture of $SiI_4$ and an alkaline earth metal silicide into a homogeneous powder,
(b) adding tin to the homogeneous powder, and
(c) reacting the $SiI_4$ with the alkaline earth metal silicide.

29. A method of forming nanostructured silicon comprising the step of
(a) ball milling a mixture of $SiI_4$ and an alkaline earth metal silicide into a homogeneous powder,
(b) adding tin to the homogeneous powder, and
(c) reacting the $SiI_4$ with the alkaline earth metal silicide.

* * * * *